(12) United States Patent
Miguchi

(10) Patent No.: US 6,904,992 B2
(45) Date of Patent: Jun. 14, 2005

(54) FOUR-WHEEL-DRIVE ALL TERRAIN VEHICLE

(75) Inventor: Akio Miguchi, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 40 days.

(21) Appl. No.: 10/108,663

(22) Filed: Mar. 27, 2002

(65) Prior Publication Data

US 2002/0139598 A1 Oct. 3, 2002

(30) Foreign Application Priority Data

Mar. 27, 2001 (JP) ......................................... 2001-089850

(51) Int. Cl.$^7$ ............................................. B60K 17/356
(52) U.S. Cl. ....................................................... 180/244
(58) Field of Search ................................. 180/247, 233, 180/244

(56) References Cited

U.S. PATENT DOCUMENTS

| | | | | |
|---|---|---|---|---|
| 3,476,226 A | * | 11/1969 | Massey | 192/27 |
| 3,763,948 A | * | 10/1973 | Eggleton et al. | 180/247 |
| 3,958,679 A | * | 5/1976 | Tamarin | 192/45 |
| 4,605,087 A | * | 8/1986 | Ashauer et al. | 180/248 |
| 4,682,516 A | * | 7/1987 | Okubo | 475/206 |
| 5,036,939 A | * | 8/1991 | Johnson et al. | 180/233 |
| 5,195,604 A | * | 3/1993 | Brockett et al. | 180/248 |
| 5,605,201 A | * | 2/1997 | McGinn et al. | 180/233 |
| 5,809,989 A | * | 9/1998 | Nelson | 126/544 |
| 6,033,334 A | * | 3/2000 | Showalter | 475/206 |
| 6,155,395 A | * | 12/2000 | Braford, Jr. | 192/48.3 |
| 6,530,447 B2 | * | 3/2003 | Seki et al. | 180/233 |
| 6,601,668 B2 | * | 8/2003 | Kitai et al. | 180/233 |

FOREIGN PATENT DOCUMENTS

| | | | | |
|---|---|---|---|---|
| GB | 2126178 A | * | 3/1984 | B60K/17/34 |
| JP | 62-125918 | | 6/1987 | |
| JP | 62-165058 | | 7/1987 | |
| JP | 63-186043 | | 1/1988 | |
| JP | 63-184221 | | 11/1988 | |
| JP | 11-001131 | | 1/1999 | |
| JP | 2000-326750 | | 11/2000 | |

\* cited by examiner

Primary Examiner—Lesley D. Morris
Assistant Examiner—Paul Royal, Jr.
(74) Attorney, Agent, or Firm—Alleman Hall McCoy Russell & Tuttle LLP

(57) ABSTRACT

Disclosed is a four-wheel-drive all terrain vehicle capable of smoothly braking wheels in braking operation of rear wheels and having simplified structures of a drive force disconnecting device and a 2WD/4WD switching device. The drive force disconnecting device is provided in a power transmission path for front-wheel-drive, for engagement/disengagement between a cam shaft and an outer race by means of a torque transmission member such as rollers, to allow a driven-side rotary member such as the outer race to become free when a drive-side rotary member such as the cam shaft is braked during 4WD. The rollers are provided between a plurality of cam faces formed on the cam shaft and a cylindrical friction face formed on the outer race, and they are placed in a torque transmission state (4WD) in which the rollers are pressed between the cam faces and the cylindrical friction face or a torque transmission release state in which the rollers are not pressed between them.

14 Claims, 9 Drawing Sheets

FOUR-WHEEL-DRIVE ALL TERRAIN VEHICLE

BACKGROUND OF THE INVENTION

1. Field of the Invention

The present invention relates to a four-wheel-drive (4WD) all terrain vehicle (ATV).

2. Description of the Related Art

The 4WD all terrain vehicle includes a full-time 4WD type all terrain vehicle and a part-time 4WD type all terrain vehicle capable of switching between 2WD and 4WD. Either of them commonly comprises a brake system for braking front wheels and a brake system for braking rear wheels that are independent from each other.

Generally, a 2WD/4WD switching device comprises a dog clutch in a power transmission path for front-wheel-drive and is adapted to perform switching between 2WD and 4WD by engagement/disengagement of the dog clutch.

4WD all terrain vehicles travel over uneven roads, mountains, steep slopes, rough terrain, shore areas, and the like, and therefore, the brakes of 4WD are strongly applied more frequently than those of general vehicles. For this reason, even in the case of the 4WD all terrain vehicle comprising independent brake systems for front wheels and rear wheels, when the brake is applied only for the rear wheels to be locked, this sometimes locks the front wheels, which results in an uncomfortable braking operation.

In the case of the 4WD all terrain vehicle using the dog clutch as the 2WD/4WD switching device, switching operation during stopping is, in fact, impossible due to phase displacement in engagement between dog claws of the dog clutch.

SUMMARY OF THE INVENTION

The present invention addresses the above-described conditions, and an object of the present invention is to provide a simply configured 4WD all terrain vehicle capable of smooth braking during 4WD and smooth switching between 2WD and 4WD during stopping in a part-time 4WD all terrain vehicle.

To address the above-identified conditions, a 4WD all terrain vehicle according to one aspect of the present invention, comprises: a drive force disconnecting device provided in a power transmission path for front-wheel-drive, and the drive force disconnecting device is constituted such that a drive-side rotary member and a driven-side rotary member are capable of being engaged/disengaged by means of a torque transmission member to allow the driven-side rotary member to become free when the drive-side rotary member is braked during 4WD.

With this constitution, when the brake is strongly enough applied for the rear wheels to be locked, the front wheels become automatically free for prevention of locking of the same. Therefore, the braking operation during 4WD is smoothly performed as desired by a rider.

In general, the 4WD all terrain vehicle comprises a front-wheel reduction gear mechanism between right and left front wheels. The above-identified drive force disconnecting device may be provided between the front-wheel reduction gear mechanism and a front-wheel-drive propeller shaft upstream of the front-wheel reduction gear mechanism in the power transmission path.

In this case, the drive force disconnecting device is contained in a case integral with the front-wheel reduction gear case in which the front-wheel reduction gear mechanism is mounted. Thereby, without a complicated seal or the like, oil in the reduction gear case can be conveniently utilized as oil for the drive force disconnecting device. Besides, the drive force disconnecting device can be simply structured and an assembly process can be easily carried out.

The drive force disconnecting device may include a plurality of cam faces formed on the drive-side rotary member, a cylindrical friction face formed on the driven-side rotary member and opposed to the cam faces as radially spaced apart therefrom; and a retainer for braking a torque transmission member provided between the cam faces and the cylindrical friction face so as to be circumferentially movable. In this case, the drive-side rotary member and the retainer are twisted relatively to each other to allow switching between a torque transmission state in which the torque transmission member is pressed between the cam faces and the cylindrical friction face and a torque transmission release state in which the torque transmission member is not pressed between the cam faces and the cylindrical friction face. Alternatively, the cylindrical friction face may be formed on the drive-side rotary member and the cam faces may be provided on the driven-side rotary member.

With such a simple structure, the drive force disconnecting device is capable of reliably transmitting a rotational torque to the driven-side rotary member during 4WD and quickly releasing the front wheels when the rear wheels are locked.

It is preferable that the torque transmission member is of a roller shape. Thereby, the drive force disconnecting device can smoothly switch the torque transmission state to the torque transmission release state when the rear wheels are locked during 4WD.

The cam faces of the drive-side rotary member are of a polygon shape symmetric with respect to a center of its rotation, and more preferably of a equilateral-hexagon shape. Such shapes permit the torque to be uniformly dispersed around the center axis of the cam shaft, thereby transmitting the torque more reliably. In addition, the transmitted torque can be released uniformly around the center axis when switching to the torque transmission release state. As a result, the connection/disconnection of the drive force can be smoothly carried out.

It is preferable that the torque transmission member is radially biased toward the cam faces by biasing means. In this case, a force by the biasing means is utilized to quickly move the torque transmission member for switching to the torque transmission release state when the rear wheels are locked during 4WD.

A 4WD all terrain vehicle according to a second aspect of the present invention comprises a 2WD/4WD switching device in the power transmission path for the front-wheel-drive, and the 2WD/4WD switching device includes a plurality of cam faces formed on the drive-side rotary member; a cylindrical friction face formed on the driven-side rotary member and opposed to the cam faces as radially spaced apart therefrom, a torque transmission member provided between the cam faces and the cylindrical friction face so as to be circumferentially movable, a retainer for braking the torque transmission member, and a braking mechanism capable of switching the retainer between a braked state and a non-braked state, and the braking mechanism causes the retainer to be in the braked state to place the torque transmission member in a torque transmission state in which the torque transmission member is pressed between the cam faces and the cylindrical friction face, and causes the retainer to be in the non-braked state to place the torque transmission member to be in the torque transmission release state in which the torque transmission member is not pressed between the cam faces and the cylindrical friction face.

With this constitution, switching between 2WD and 4WD becomes possible regardless of whether the vehicle is traveling or stopping unlike the conventional dog clutch type 2WD/4WD switching device, and therefore, the operation is more conveniently performed.

It is preferable that the braking mechanism includes a cam plate having a cam protrusion and a braking plate provided with a pressure-receiving portion and which is in contact with the retainer. With this constitution, the rotation of the cam plate causes the cam protrusion to be pressed against the pressure-receiving portion, thereby braking the retainer. Thus, the braking force is easily given to the retainer and therefore, switching between 2WD and 4WD can be performed. Alternatively, the cam protrusion may be provided on the braking plate and the pressure-receiving portion may be provided on the cam plate.

The pressure-receiving portion may be of a leaf-spring shape. Thereby, the switching operation by the cam plate can be smoothly performed. Besides, the braking force of the retainer can be kept to have appropriate largeness, and the reduction of torque transmission efficiency can be prevented.

The above and further objects and features of the invention will more fully be apparent from the following detailed description with accompanying drawings.

DETAILED DESCRIPTION OF THE PREFERRED EMBODIMENTS

The present invention will now be described in detail referring to the accompanying drawings illustrating the embodiments thereof.

(Embodiment 1)

Figure 1:
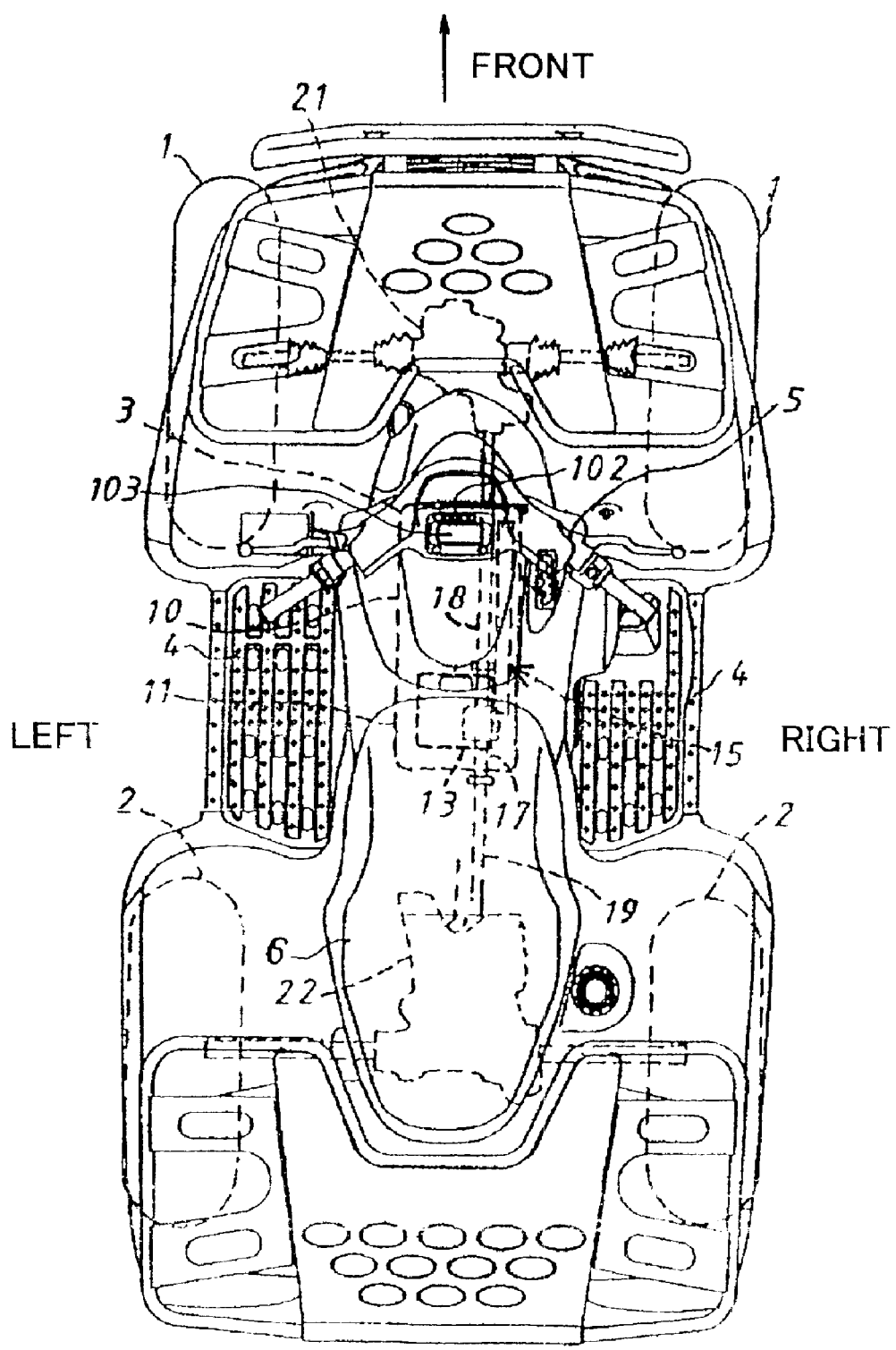
FIG. 1 is a plan view showing an entire 4WD all terrain vehicle to which the present invention is applied.

FIG. 1 is a plan view showing a straddle-type 4WD all terrain vehicle to which the present invention is applied. The vehicle comprises a pair of right and left front wheels 1, a pair of right and left rear wheels 2, an engine 3 mounted between the front wheels 1 and the rear wheels 2, and steps 4 on right and left sides of the engine 3. The vehicle further comprises a bar-type steering handle 5 at a front side of an upper portion of the vehicle's body, and a straddle-type seat 6 at a rear side of the upper portion. The handle 5 is provided with indicators such as a speed meter 103, and display lamps 102 such as a 2WD display lamp and a 4WD display lamp, at a center thereof.

A transmission case 11 is provided integrally with a crankcase 10 of the engine 3 at a rear end of the crankcase 10. A gear-type transmission 13 is mounted in the transmission case 11. A V-belt continuously variable transmission 15 is provided on the right side face of the crankcase 10 and located upstream of the gear-type transmission 13 in a power transmission path.

A drive shaft 17 is provided below the transmission case 11 such that it extends along the longitudinal direction of the vehicle. A front-wheel-drive propeller shaft 18 and a rear-wheel-drive propeller shaft 19 are respectively connected to a front end and a rear end of the drive shaft 17. A front end of the propeller shaft 18 is connected to a gear mechanism in a front-wheel reduction gear case 21 and a rear end of the propeller shaft 19 is connected to a gear mechanism in a rear-wheel reduction gear case 22.

Figure 2:
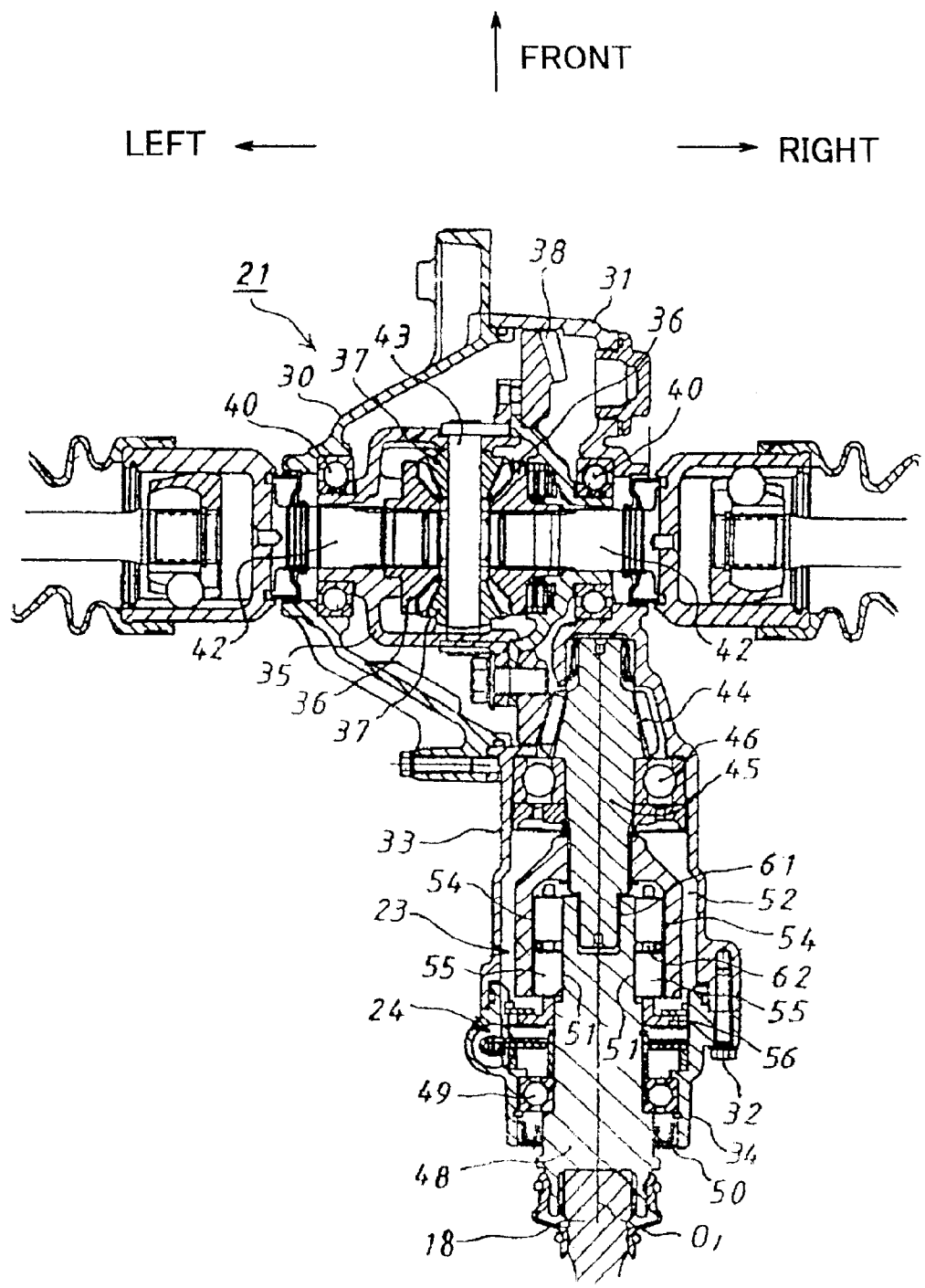
FIG. 2 is an enlarged cross-sectional view showing a front-wheel reduction gear case of FIG. 1.

FIG. 2 is an enlarged cross-sectional view of the front-wheel reduction gear case 21. The gear case 21 is formed by coupling a pair of half case portions 30,31. A tubular input case portion 33 is provided integrally with the right case portion 31 as protruded rearwardly therefrom, and a tubular cover case 34 is removably coupled to a rear end of the input case portion 33 by means of bolts 32.

The input case portion 33 and the cover case 34 serve as a housing for the drive force disconnecting device 23 and the 2WD/4WD switching device 24. Gear oil is filled inside the input case portion 33 and the cover case 34, for use in these portions and the front-wheel reduction gear case 21.

A differential gear mechanism is built in the front-wheel reduction gear case 21. As is well known, the differential gear mechanism is comprised of a differential case 35, a pair of right and left bevel side gears 36, a pair of bevel pinion gears 37 in mesh with the side gears 36, and a crown-shaped reduction large gear 38.

The differential case 35 is rotatably supported by the front-wheel reduction gear case 21 by means of a bearing 40, and the side gears 36 are provided in the differential case 35 and respectively fixed to right and left front-wheel output shafts 42. The pinion gears 37 are rotatably fitted to a support shaft 43 suspended in the differential case 42 and in mesh with the side gears 36. The reduction large gear 38 is fixed to an outer periphery of the differential case 35 and in mesh with an input pinion gear 44.

A front-wheel input shaft 45 integrally provided with the input pinion gear 44 is rotatably supported by the input case portion 33 by means of a bearing 46. A cam shaft 48 is provided behind the input shaft 45 along a center axis O1 identical to that of the input shaft 45. A concave portion is formed at a front end of the cam shaft 48 and rotatably fitted to a small-diameter rear end portion of the input shaft 45 by means of a bearing metal 61 or the like. The cam shaft 48 is rotatably supported by the cover case 34 by means of a bearing 49 and protruded rearwardly from the cover case 34 through an oil seal 50. A rear end of the cam shaft 48 is spline-connected to a front end of the propeller shaft 18 and adapted to rotate integrally therewith.

(Drive Force Disconnecting Device)

Figure 3:
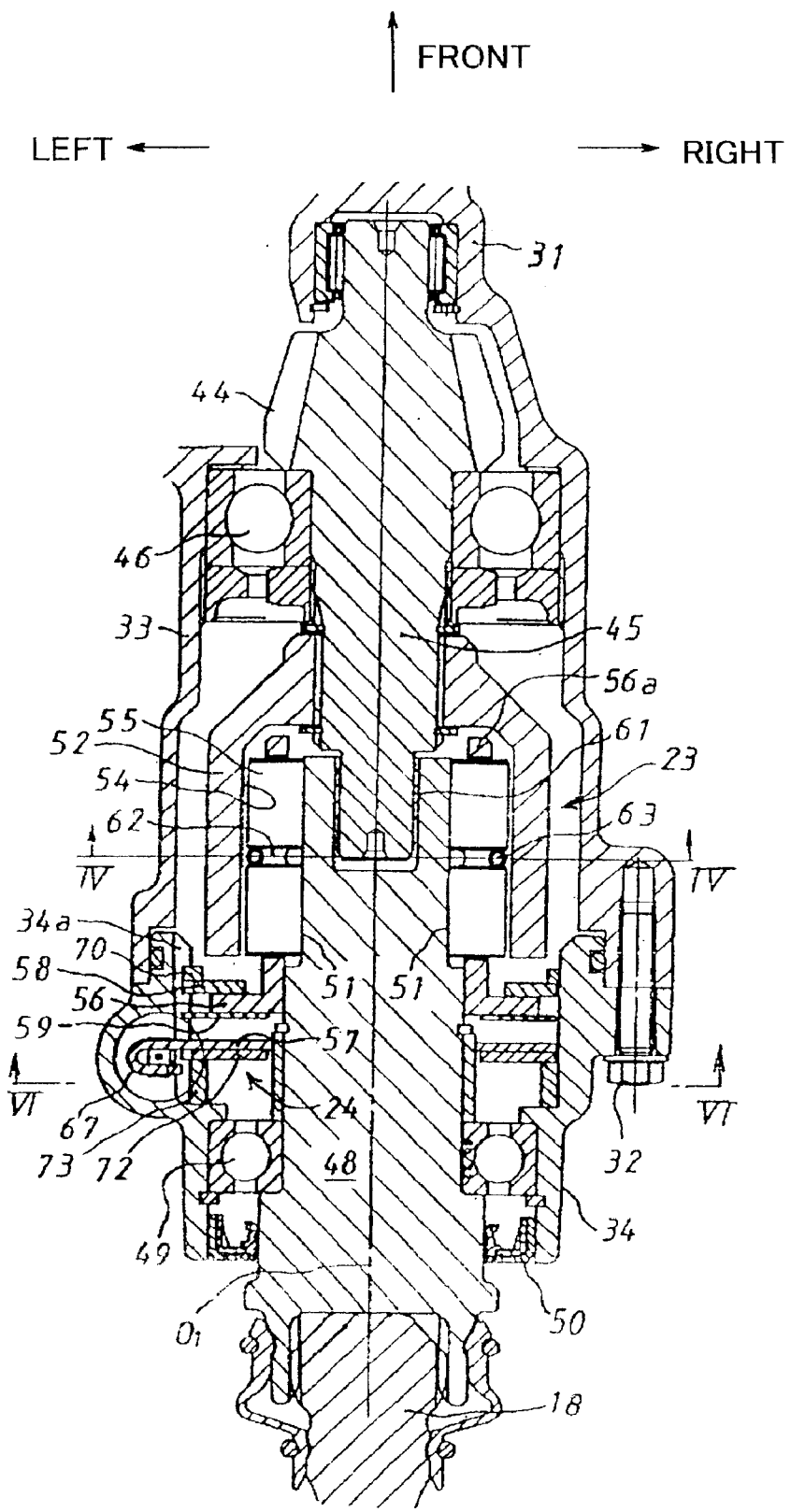
FIG. 3 is an enlarged cross-sectional view showing a drive force disconnecting device and a 2WD/4WD switching device of FIG. 2.

FIG. 3 is an enlarged cross-sectional view of the drive force disconnecting device 23. The drive force disconnecting device 23 is provided with a plurality of cam faces 51 formed on an outer peripheral face of a front portion of the cam shaft 48, a cylindrical outer race 52 spline-connected to the input shaft 45, a cylindrical friction face 54 formed on an inner periphery of the outer race 52, a plurality of rollers (torque transmission members) 55 each provided between the cylindrical friction face 54 and each of the cam faces 51, a retainer 56 for holding the rollers 55, a pair of front and rear braking plates 58, 59 for braking the retainer 56, and a garter coil spring 63 for biasing the rollers 55 toward the center axis O1 of the cam shaft 48.

The rollers 55 are connected in series in the axial direction. The front and rear rollers 55 are integral with each other by means of a connecting portion 62. The garter coil spring 63 is provided radially outwardly of the connecting portion 62. In this embodiment, the cam shaft 48 having the cam faces 51 corresponds to a drive-side rotary member of the drive force disconnecting device 23 and the outer race 52 having the cylindrical friction face 54 corresponds to a driven-side rotary member.

Figure 4:
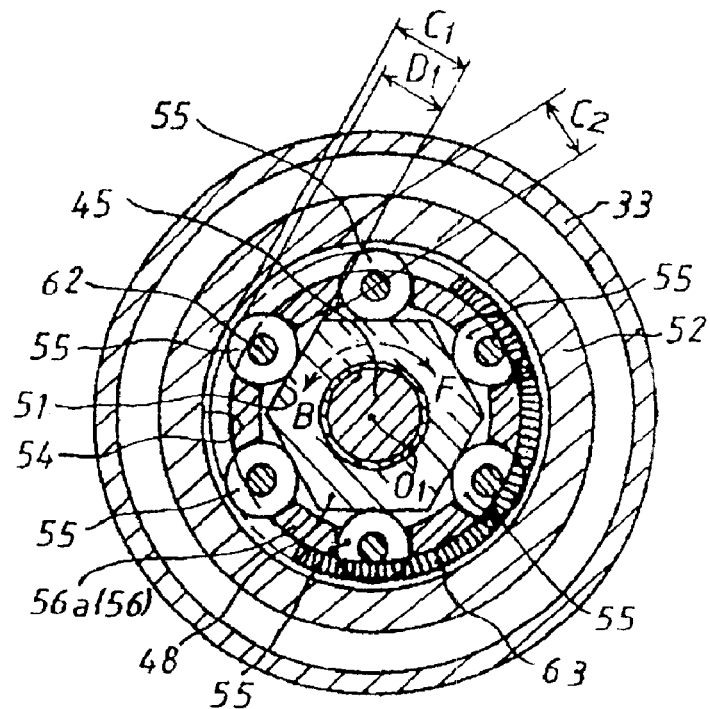
FIG. 4 is a cross-sectional view taken along line IV—IV of FIG. 3 and showing 2WD or rear-wheel locked state.

FIG. 4 is a cross-sectional view taken along line IV—IV of FIG. 3. In FIG. 4, the rollers 55 are illustrated as being at a torque transmission release position (2WD position). The cam shaft 48 is of an equilateral-hexagon shape to have even six cam faces 51 around the center axis O1. The rollers 55 are provided in contact with the respective cam faces 51. A pocket-pillar portion 56a of the retainer 56 is interposed between two rollers 55. This makes it possible that all the rollers 55 are equally spaced, and rotatable around the center axis O1 and brakeable at the same time. A radial clearance between each of the cam faces 51 and the cylindrical friction face 54 is set such that a clearance C1 between a circumferential center of each cam face 51 and the cylindrical friction face 54 is larger than a diameter D1 of the roller 55 and a clearance C2 between a circumferential edge of the cam face 51 and the cylindrical friction face 54 is smaller than the diameter D1 of the roller 55.

The rollers 55 are respectively biased by the garter coil spring 63 toward the center axis O1, thereby allowing the rollers 55 to be in contact with the cam faces 51 and biased toward the circumferential centers of the cam faces 51 (torque transmission release position).

(2WD/4WD Switching Device)

Referring to FIG. 3 again, in addition to the above-mentioned constitution of the drive force disconnecting device 23, the 2WD/4WD switching device 24 is provided with a cam plate 57 or the like for allowing switching braking of the retainer 56 between ON and OFF.

An annular body portion of the retainer 56 is fitted to a cylindrical outer peripheral face of the cam shaft 48 and retained between front and rear braking plates 58, 59 axially provided. The braking plates 58, 59 are unrotatably engaged with the cover case 34 by engagement of protrusions formed on their outer peripheries with inner peripheral concave portions 34a of the cover case 34. Further, the front braking plate 58 is stopped by a front stopper ring 70 for prevention of forward movement. A cam plate 57 for switching between 2WD and 4WD is provided behind the rear braking plate 59. A back plate 72 for restricting rearward movement of the cam plate 57 is provided on the rear side thereof. A collar 73 is provided behind the back plate 72 as interposed between a step surface of the cover case 34 and the back plate 72.

Figure 9:
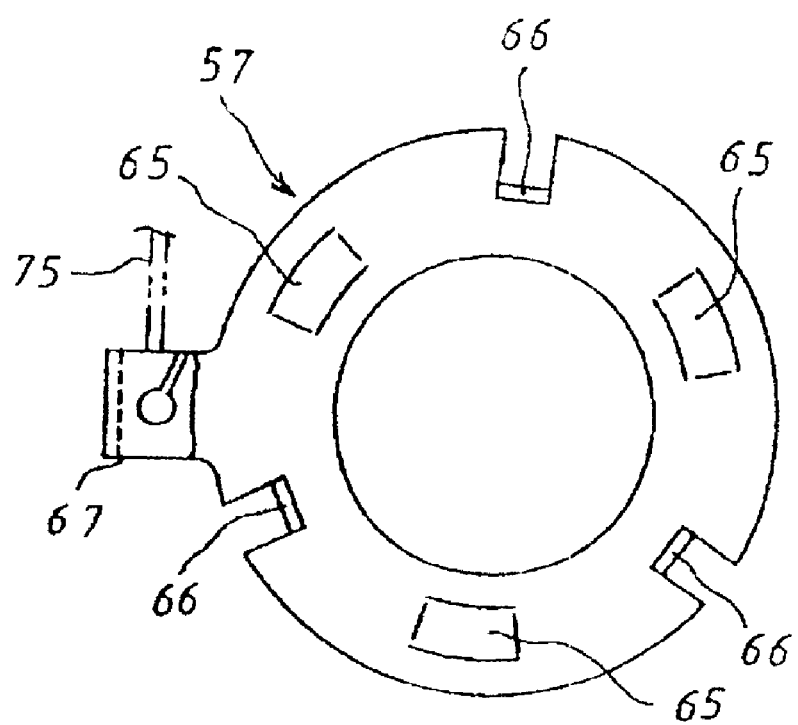
FIG. 9 is an elevational view of a cam plate for switching between 2WD and 4WD of FIG. 3, seen from a rear side of the vehicle.

FIG. 9 is a plan view of the cam plate 57 seen from the rear side of the vehicle. The cam plate 57 is provided with arched cam protrusions 65 at three positions circumferentially equally spaced such that they are axially forwardly protruded therefrom. Spring stopper portions 66 are each provided between circumferentially adjacent protrusions 65 such that they are bent so as to be axially rearwardly protruded. A cable connecting portion 67 is bent at an outer peripheral end of the cam plate 57 and a cable 75 connected to a 2WD/4WD switching lever (not shown) is coupled to the cable connecting portion 67.

Figure 6:
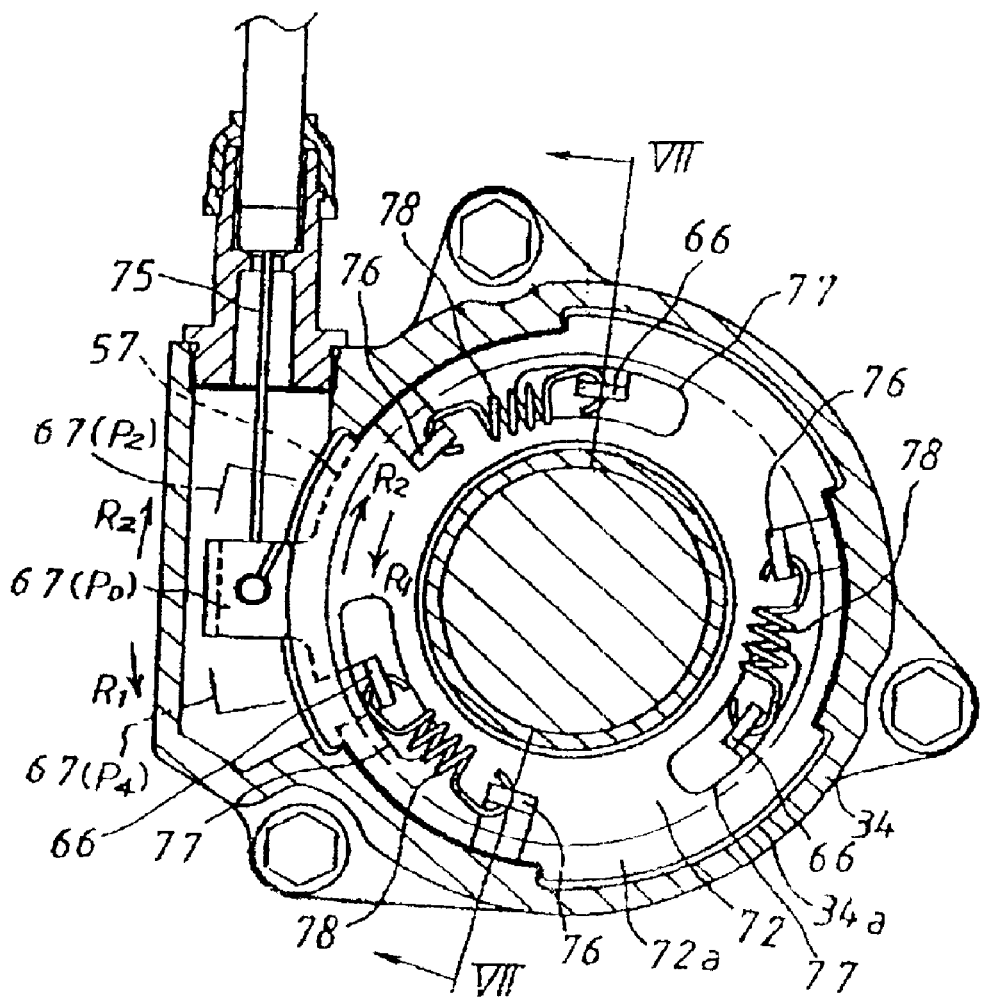
FIG. 6 is a cross-sectional view taken along line VI—VI of FIG. 3.

FIG. 6 is a cross-sectional view taken along line VI—VI of FIG. 3. The back plate 72 is unrotatable by engagement of protrusions 72a on its outer periphery with the concave portions 34a of the cover case 34. The back plate 72 is provided with spring stopper portions 76 at three circumferentially equally spaced positions of the back plate 72 such that they protrude axially rearwardly, as well as guide holes 77 between circumferentially adjacent spring engagement portions 76. The spring engagement portions 66 of the cam plate 57 protrude rearwardly into the guide holes 77, and return springs 78 are each compressively provided between the spring stopper portion 66 and the spring engagement portion 76 of the back plate 72. The return springs 78 serve to bias the cam plate 57 toward a direction indicated by an arrow R1 so as to be placed at 4WD position corresponding to a position P4 of the cable connecting portion 67.

The 2WD/4WD switching lever is operated to pull the cable 75 upwardly (as indicated by an arrow R2), thereby causing the cam plate 57 to rotate against the return springs 78 as indicated by the arrow R2. Thus, the cam plate 57 can be switched to the 2WD position corresponding to a position P2 of the cable connecting portion 67.

Figure 7:
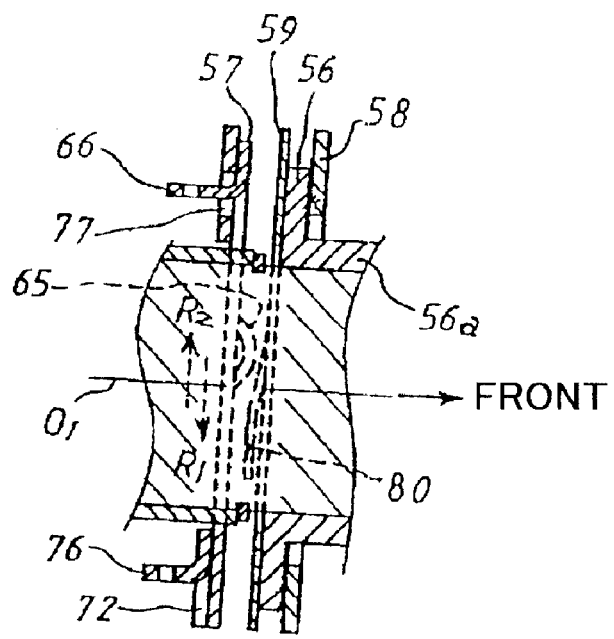
FIG. 7 is a cross-sectional view taken along line VII—VII of FIG. 6 and showing 2WD.

FIG. 7 is a cross-sectional view taken along line VII—VII of FIG. 6. The rear braking plate 59 is provided with a leaf spring portion (pressure-receiving portion) 80 protruded rearwardly by cutting out and raising the plate 59. When the cam plate 57 is placed at the 2WD position, the cam protrusion 65 is circumferentially away from the leaf spring portion 80 as shown in FIG. 7, and friction resistance between the front and rear braking plates 58, 59, and the retainer 56 is released, which places the retainer 56 in a non-braked state.

Figure 8:
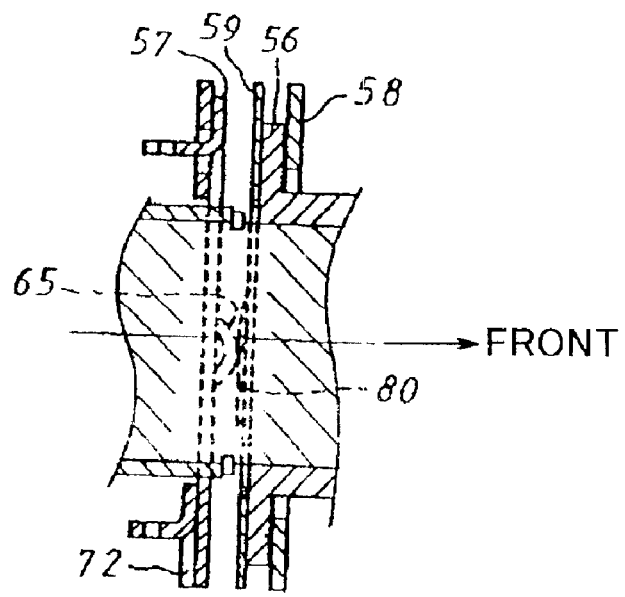
FIG. 8 is a cross-sectional view taken along line VII—VII of FIG. 6 and showing 4WD.

On the other hand, as shown in FIG. 8, when the cam plate 57 is at the 4WD position, the cam protrusion 65 presses the leaf spring portion 80 and hence, the rear braking plate 59 to its front side by a constant thrust, thereby causing the retainer 56 to be slightly pressed between the front and rear braking plates 58,59. Thus, the retainer 56 is braked. Here, the "braking" is defined as an operation for suppressing the rotation of the retainer 56 together with the roller 55 by a suitable friction resistance to the retainer 56 rather than stopping of the rotation of the retainer 56.

(Forward 2WD Drive)

FIG. 6 shows the cam plate 57 at a position (expressed as "Po") between the 2WD position P2 and the 4WD position P4. In this state, by switching the 2WD/4WD switching lever to the 2WD position, the cable 75 is pulled upwardly, thereby causing the cam plate 57 to rotate against an elastic force of the return springs 78 to the 2WD position P2. In this state, as shown in FIG. 7, the cam protrusion 65 of the cam plate 57 is away from the leaf spring portion (pressure-receiving portion) 80 of the rear braking plate 59, which places the retainer 56 in the non-braked state.

When the retainer 56 is in the non-braked state, the respective rollers 55 are held at the circumferential centers of the cam faces 51, i.e., at the torque transmission release position (2WD position), by means of the garter coil spring 63. In the state of FIG. 4, when the cam shaft 48 rotates toward a forward rotational direction F, the rollers 55, the retainer 56, and the garter coil spring 63 rotate integrally with the cam shaft 48. In actuality, since the rollers 55 are away from the cylindrical friction face 54, the rotational torque is not transmitted to outer race 52. That is, transmission of torque to the front wheels 1 is disconnected and thereby the vehicle is brought into the 2WD of the rear wheels 2.

(Forward 4WD Drive)

Referring to FIG. 6, when the 2WD/4WD switching lever is switched to the 4WD position, the cable 75 is loosened to cause the cam plate 57 to rotate to the 4WD position P4 as indicated by the arrow R1 by the elastic force of the return springs 78. In this state, as shown in FIG. 8, the cam protrusion 65 of the cam plate 57 presses the leaf spring portion 80 of the rear braking plate 59 and the annular body portion of the retainer 56 is slightly pressed between the braking plates 58, 59, which places the retainer 56 in the braked state.

Figure 5:
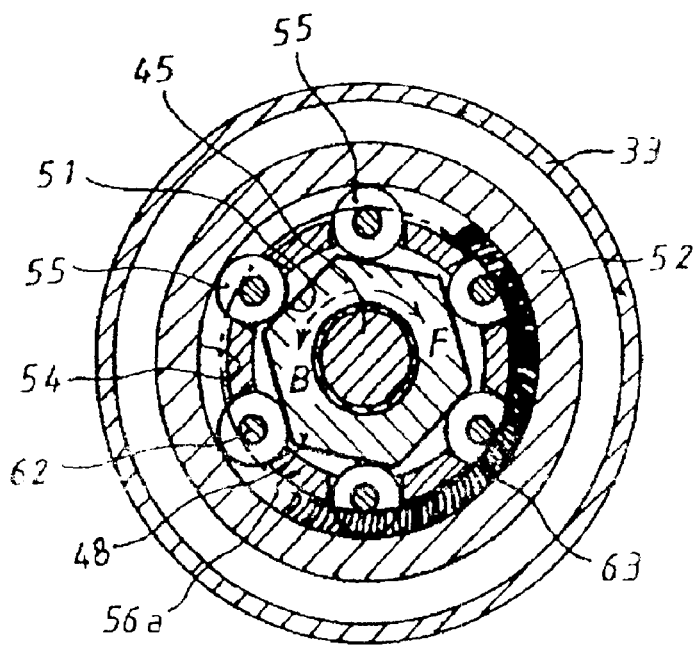
FIG. 5 is a cross-sectional view taken along line IV—IV of FIG. 3 and showing 4WD.

When the cam shaft 48 of FIG. 4 rotates toward the forward rotational direction F in the above braked state, only the cam shaft 48 starts to rotate relatively to the braked retainer 56 and rollers 55 toward the forward rotational direction F. In other words, the cam shaft 48 starts to be twisted relative to the outer race 52, the rollers 55, and the retainer 56 toward the forward rotational direction F. Due to phase displacement between the cam faces 51 and the rollers 55 toward the forward rotational direction F, the rollers 55 start to be pressed radially outwardly by the cam faces 51, and as shown in FIG. 5, pressed between the cylindrical friction face 54 and the cam faces 51, thereby allowing a torque to be transmitted from the cam shaft 48 to the outer race 52 via the rollers 55. More specifically, the outer race 52 rotates integrally with the rollers 55, the retainer 56, and the cam shaft 48 toward the forward rotational direction F, to drive the front wheels 1, thus placing the vehicle in 4WD. The switching from 2WD to 4WD can be achieved regardless of whether the vehicle is traveling or stopping. If the lever is switched to 4WD during stopping, then the vehicle automatically switches to the 4WD of FIG. 5 as soon as the vehicle starts to travel.

During 4WD, the retainer 56 rotates while generating friction between the stationary braking plates 58, 59. The friction resistance given to the retainer 56 is as small as the force for movement of the rollers 55 of FIG. 4 to the vicinity of edge of the cam faces 51, and therefore, the friction between the braking plates 58, 59 and the retainer 56 hardly affects transmission of the rotational torque during 4WD.

(Rear Wheel Brake Actuation During Forward 4WD)

During 4WD of FIG. 5, in a case where the brake is strongly applied for the rear wheels 2 to be locked, the cam shaft 48 of FIG. 5 might be locked and stopped. Nevertheless, in this case, the outer race 52 continues to rotate relative to the stopped cam shaft 48 toward the forward rotational direction F due to inertia rotation of the front wheels 1. Along with the rotation of the outer race 52 toward the forward rotational direction F, the rollers 55 move on the cam faces 51 toward the forward rotational direction F so as to be, as shown in FIG. 4, away from the cylindrical friction face 54, which places the rollers 55 in the torque transmission release state. In other words, by setting the outer race 52 and the front wheels 1 free, the drive force disconnecting device 23 is disconnected for prevention of locking of the front wheels 1.

(Reverse)

Referring to FIG. 4 again, during reverse drive, the cam shaft 48 rotates toward a reverse rotational direction B. The operations of 2WD, 4WD, and the braking function during 4WD are basically the same as those of the forward rotation except that the rotational direction is reversed.

(Assembly of Drive Force Disconnecting Device)

Referring to FIG. 3 again, before mounting the cover case 34 to the input case portion 33, the outer race 52 is spline-connected to a rear portion of the input shaft 45 for prevention of disengagement. Also, the bearing 49, the cam shaft 48, the cam plate 57, the braking plates 58, 59, and the like, are mounted to the cover case 34 and the rollers 55 and the retainer 59 are mounted to the cam shaft 48. Thus, most of parts of the drive force disconnecting device 23 and 2WD/4WD switching device 24 are integrated within the cover case 34 as a unit, and the resulting cover case 34 is fastened to the input case portion 33 by means of the bolts 32. In brief, one assembling operation enables the drive force disconnecting device 23 and the 2WD/4WD switching device 24 to be easily assembled into the front-wheel reduction gear case 21.

(Embodiment 2)

Figure 10:
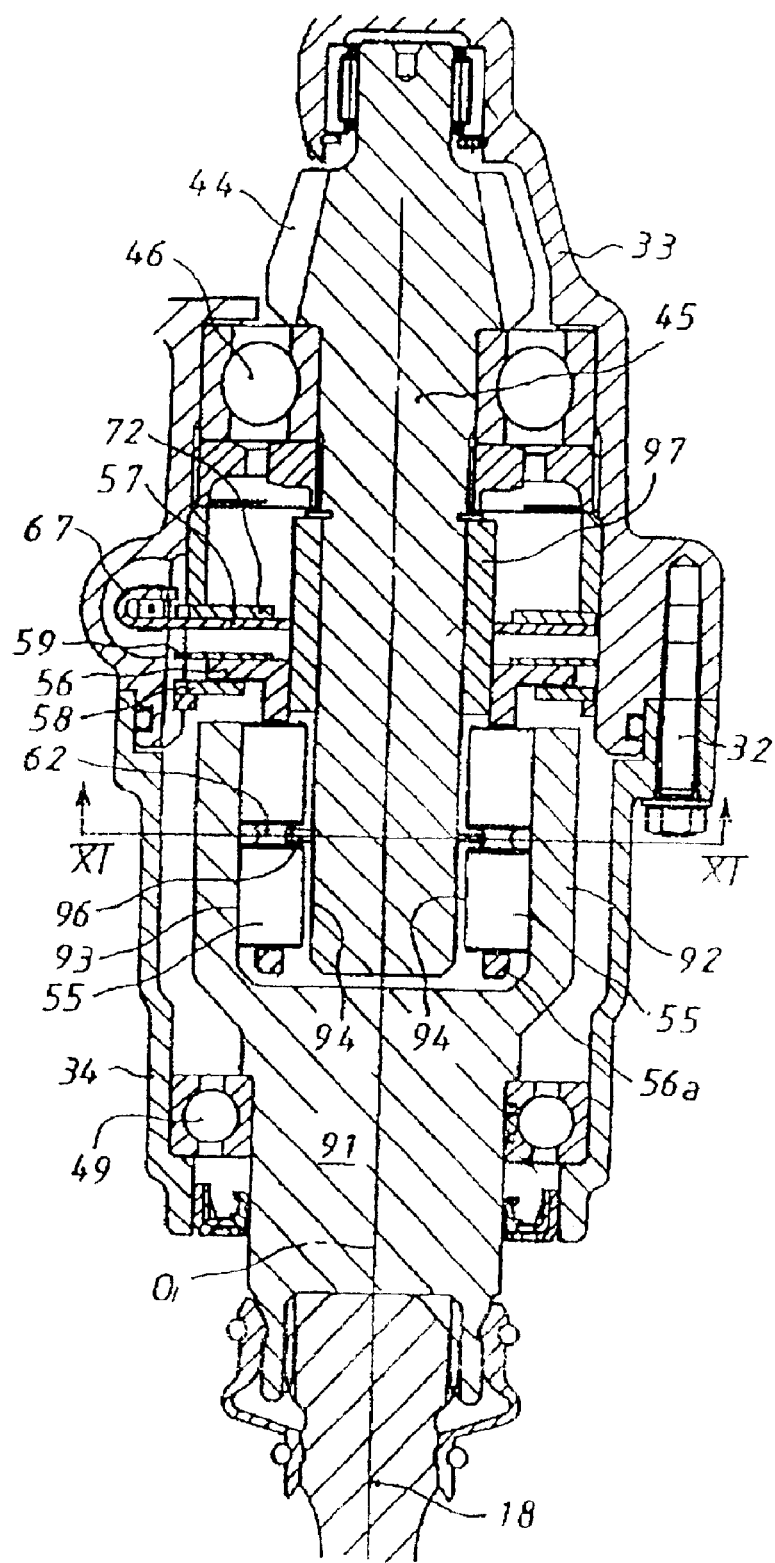
FIG. 10 is an enlarged cross-sectional view of FIG. 3, showing a drive force disconnecting device and a 2WD/4WD switching device according to another embodiment.

FIG. 10 shows a structure in which the radial positional relationship between the cam faces and the cylindrical friction face of FIG. 3 is inside out. In FIG. 10, a cam tubular portion 92 is formed integrally with a cam shaft 91 connected to the front-wheel-drive propeller shaft 18 to form cam faces 93 on an inner periphery of the cam tubular portion 92 and a cylindrical friction face 94 is formed on an outer peripheral face of a rear end portion of the input shaft 45. The rollers 55 are each provided between the cylindrical friction face 94 and the cam face 93 that is radially outward and a ring spring 96 is provided on the rollers 55 on the side of the center axis O1. The retainer 56, the braking plates 58, 59, and the cam plate 57 are mounted to the input case portion 33. The retainer 56 is fitted to the outer periphery of the input shaft 45 via a sleeve 97. In this embodiment, the cam shaft 91 having the cam tubular portion 92 corresponds to the drive-side rotary member and the input shaft 45 corresponds to the driven-side rotary member.

As should be understood, the placement and shapes of the cylindrical friction face 94, the cam faces 93, and the ring spring 96 differ from those of FIG. 3, and the direction and placement of the retainer 56, the braking plates 58, 59, and the cam plate 57 in the direction of the center axis O1 differ from those of FIG. 3. Since the other basic function is similar to that of FIG. 3, the same or corresponding parts are referenced by the same reference numerals, and as such, a detailed description thereof is omitted.

Figure 11:
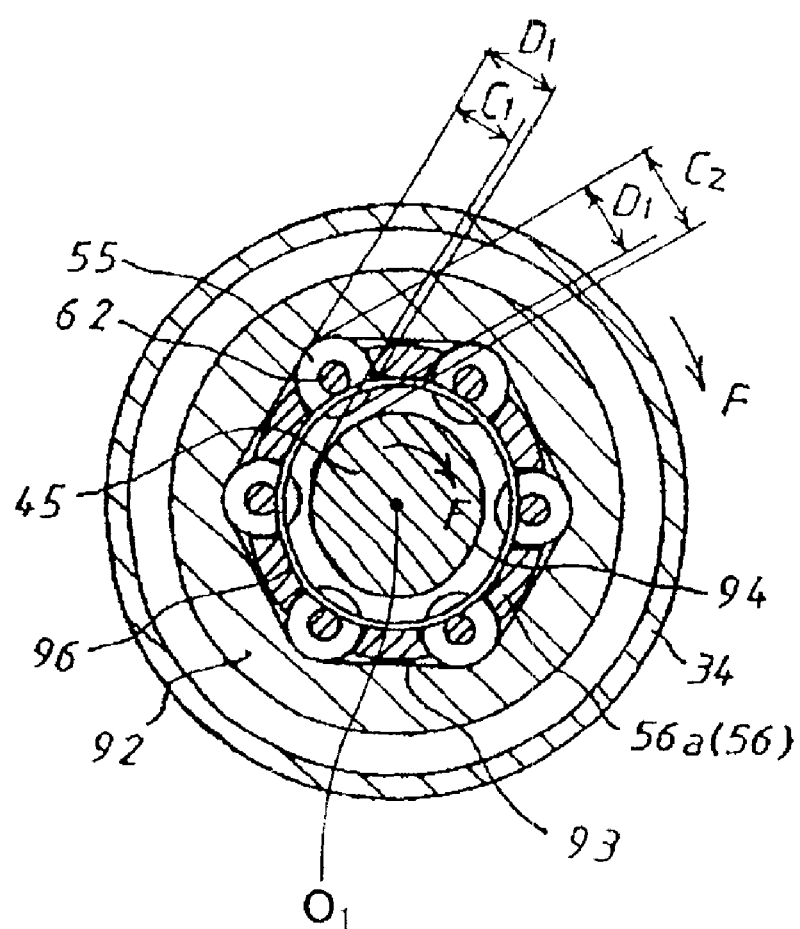
FIG. 11 is a cross-sectional view taken along line XI—XI of FIG. 10.

FIG. 11 is a cross-sectional view taken along line XI—XI of FIG. 10. Here, the cam faces 93 are comprised of six faces because the cam tubular portion 92 has equilateral-hexagonal inner peripheral face. The ring spring 96 is compressively provided at the connecting portion 62 of the respective rollers 55 on the side of the center axis O1 and biases the rollers 55 radially outwardly to be pressed against the cam faces 93.

Differently from the radial clearance between the cam face 51 and the cylindrical friction face 54 of FIG. 4, the clearance C2 at the circumferential edge of the cam face 93 is larger than the diameter D1 of the rollers 55 and the vicinity of the edge corresponds to the torque transmission release position (2WD position). The clearance C1 at the circumferential center is smaller than the diameter D1 of the rollers 55 and the vicinity of the center corresponds to the torque transmission position (4WD position). Therefore, FIG. 1 illustrates the torque transmission release state (2WD) in which the rollers 55 are located in the vicinity of the circumferential edge of the cam faces 93.

When the 2WD/4WD switching lever is switched from the 2WD of FIG. 11 to 4WD to allow the retainer 56 and the rollers 55 to be braked, and in this braked state, when the cam tubular portion 92 rotates toward the forward rotational direction F, only the cam tubular portion 92 starts to be twisted relatively to the input shaft 45, the retainer 56, and the rollers 55 toward the forward rotational direction F. Due to phase displacement between the cam faces 93 and the rollers 55 toward the forward rotational direction F, the rollers 55 start to be pressed radially inwardly by the cam faces 93 and therefore pressed between the cylindrical friction face 94 and the cam faces 93, thereby allowing a torque to be transmitted from the cam tubular portions 92 to the input shaft 45 via the rollers 55. That is, the input shaft 45 rotates integrally with the rollers 55, the retainer 56, and the cam tubular portion 92 toward the forward rotational direction F, to drive the front wheels 1, which places the vehicle in 4WD.

During 4WD, when the brake is strongly applied for the rear wheels 2 to be locked, the cam tubular portion 92 might be locked and stopped. Nevertheless, in that case, the input shaft 45 continues to rotate with respect to the stopped cam tubular portion 92 toward the forward rotational direction F due to inertia rotation of the front wheels 1. Along with the rotation of the input shaft 45 toward the forward rotational direction F, the rollers 55 move on the cam faces 51 toward the forward rotational direction F so as to be away from the cylindrical friction face 94, which places the rollers 55 in the torque transmission release state, as shown in FIG. 11.

(Embodiment 3)

The drive force disconnecting devices having 2WD/4WD switching function of FIGS. 1 through 9 and FIGS. 10, 11 are only illustrative and applicable to the full-time 4WD vehicle. In that case, the 2WD/4WD switching mechanism such as the cam plate 57 or the like of FIG. 3 may be replaced by the constitution in which the rear braking plate 59 is biased by a spring toward the retainer 56 to be kept in the braked state. For the purpose of keeping the retainer in the braked state, any other pressing means including hydraulic means, pneumatic means, etc, may be employed, instead of the above-identified spring.

The position at which the drive force disconnecting device 23 is placed is not limited to the portion of the front-wheel reduction gear case 21 of FIGS. 1, 2, but may be provided at a suitable position of the front-wheel-drive power transmission path such as the position between the drive shaft 17 and the front-wheel-drive propeller shaft 18 (portion of the engine connected to the propeller shaft).

As the torque transmission member, balls or slidable cuneal (wedge) members may be employed instead of the rollers 55.

While the cam faces 51 of the cam shaft 48 are of an equilateral-hexagon shape in FIG. 4, they may be of equilateral-polyhedron shapes, such as, equilateral-triangle, equilateral-square, and equilateral-pentagon. In addition, when the cam faces 93 are formed as the inner peripheral face of the cam tubular portion 92 as shown in FIG. 11, they may be of equilateral-polyhedron shapes, such as, equilateral-triangle, equilateral-square, and equilateral-pentagon as well.

Instead of the above-mentioned equilateral-polyhedral cam faces 51, 93, there may be provided a plurality of circumferentially spaced cam faces.

While the braking plate 59 of FIG. 7 is provided with the leaf spring portion 80 as the pressure-receiving portion with which the cam protrusion 65 makes contact, the leaf spring portion 80 may be replaced by a coil spring. Moreover, a pressure-receiving portion comprised of a rigid body may be provided.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embodied by the claims.

What is claimed is:

1. A four-wheel-drive all terrain vehicle, comprising:
an engine for driving the vehicle;
a power transmission path including an upstream path and a downstream paths, the power transmission path being configured to provide front-wheel-drive through which a drive force from the engine is transmitted to front wheels through the upstream path and the downstream path in this order; and
a drive force disconnecting device provided in the power transmission path between the upstream path and the downstream path, the drive force disconnecting device being configured to connect and disconnect transmission of the drive force from the engine, the drive force disconnecting device including:
   a drive-side rotary member connected to the upstream path of the power transmission path on the engine side, the drive-side rotary member being rotated by the drive force from the engine;
   a driven-side rotary member connected to the path of the power transmission path on the front-wheel side, for rotating to drive the front wheels;
   a torque transmission member interposed between the drive-side rotary member and the driven-side rotary member, for transmitting rotation of the drive-side rotary member to the driven-side rotary member; and
   a braking mechanism configured to brake the torque transmission member and capable of switching between a braked state and non-braked state;
wherein the drive force disconnecting device is adapted to stop transmission of the rotation of the drive-side rotary member to the driven-side rotary member by means of the torque transmission member when the vehicle is in four-wheel drive and the rotation of the drive-side rotary member is braked; and
wherein the braking mechanism is configured to switch to the braked state to allow the torque transmission member to be placed in torque transmission state in which the torque transmission member transmits the rotation of the drive-side rotary member to the driven-side rotary member, and to switch to the non-braked state to allow the torque transmission member to be placed in a torque transmission release state in which the torque transmission member does not transmit the rotation of the drive-side rotary member to the driven-side rotary member.

2. The four-wheel-drive all terrain vehicle according to claim 1, further comprising:
a front-wheel reduction gear mechanism provided between the right and left front wheels, in the downstream path; and
a front-wheel-drive propeller shaft provided upstream of the front-wheel reduction gear mechanism in the upstream path of the power transmission path;

wherein the drive force disconnecting device is provided between the front-wheel reduction gear mechanism and the front-wheel-drive propeller shaft.

3. The four-wheel-drive all terrain vehicle according to claim 2, further comprising:
a front-wheel reduction gear case configured to contain the front-wheel reduction gear mechanism;
wherein the drive-force disconnecting device is contained in a case integral with the front-wheel reduction gear case.

4. The four-wheel-drive all terrain vehicle according to claim 1,
wherein the torque transmission member is one of a plurality of torque transmission members; and
wherein the drive force disconnecting device includes:
a plurality of cam faces formed on a peripheral face of the drive-side rotary member in the rotational direction; and
a cylindrical friction face formed on the driven-side rotary member and opposed to the cam faces as radially spaced a predetermined clearance apart therefrom;
wherein the braking mechanism includes:
a retainer configured to retain the plurality of torque transmission members, which are provided between the cam faces and the cylindrical friction face, spaced in the rotational direction;
biasing means for radially biasing the plurality of torque transmission members toward the cam faces;
a braking assembly configured to selectively brake the retainer; and
an operating mechanism configured to operate the braking assembly to switch between the braked state and the non-braked state, the operating mechanism configured to be actuated by an operator; and
wherein the operating mechanism is configured to cause the drive-side rotary member and the retainer to twist relative to each other, to allow switching between a torque transmission state in which the torque transmission members are pressed between the cam faces and the cylindrical friction face to transmit the rotation of the drive-side rotary member to the driven-side rotary member, and a torque transmission release state in which the plurality of torque transmission members are not pressed between the cam faces and the cylindrical friction face, such that rotation of the drive-side rotary member is not transmitted to the driven-side rotary member.

5. The four-wheel-drive all terrain vehicle according to claim 4, wherein the torque transmission member is of a roller shape.

6. The four-wheel-drive all terrain vehicle according to claim 4, wherein the cam faces are the peripheral face of the drive-side rotary member in the rotational direction of a polygon shape symmetric with respect to a center of rotation.

7. The four-wheel-drive all terrain vehicle according to claim 6, wherein the polygon shape is equilateral hexagon.

8. The four-wheel-drive all terrain vehicle according to claim 4, wherein the braking assembly includes:
a cam plate; and
a braking plate that is in contact with the retainer;
wherein one of the cam plate and the braking plate is provided with a cam protrusion and the other is provided with a pressure-receiving portion, and the cam plate is pressed against the pressure-receiving portion in association with rotation of the cam plate such that the cam protrusion and the pressure-receiving portion are pressed against each other, thereby braking the retainer.

9. The four-wheel-drive all terrain vehicle according to claim 8, wherein the cam protrusion is provided in the cam plate, and the pressure-receiving portion is provided in the braking plate.

10. The four-wheel-drive all terrain vehicle according to claim 8, wherein the pressure-receiving portion is of a leaf-spring shape.

11. The four-wheel-drive all terrain vehicle according to claim 1, wherein the torque transmission member is one of a plurality of torque transmission members; and
wherein the drive force disconnecting device includes:
a plurality of cam faces formed on a peripheral face of the driven-side rotary member in the rotational direction; and
a cylindrical friction face formed on the drive-side rotary member and opposed to the cam faces as radially spaced a predetermined clearance apart therefrom; and
wherein the braking mechanism includes:
a retainer configured to retain the plurality of torque transmission members, which are provided between the cam faces and the cylindrical friction face, spaced in the rotational direction;
biasing means for radially biasing the plurality of torque transmission members toward the cam faces;
a braking assembly configured to selectively brake the retainer; and
an operating mechanism configured to operate the braking assembly to switch between the braked state and the non-braked state, the operating mechanism configured to be actuated by an operator; and
wherein the operating mechanism is configured to cause the drive-side rotary member and the retainer to twist relative to each other to allow switching between a torque transmission state in which the plurality of torque transmission members are pressed between the cam faces and the cylindrical friction face to transmit the rotation of the drive-side rotary member to the driven-side rotary member, and a torque transmission release state in which the plurality of torque transmission members are not pressed between the cam faces and the cylindrical friction face, such that rotation of the drive-side rotary member is not transmitted to the driven-side rotary member.

12. The four-wheel-drive all terrain vehicle according to claim 11, wherein the braking assembly includes:
a cam plate; and
a braking plate that is in contact with the retainer;
wherein one of the cam plate and the braking plate is provided with a cam protrusion and other is provided with a pressure-receiving portion, and the cam plate is pressed against the pressure-receiving portion in association with rotation of the cam plate such that the cam protrusion and the pressure-receiving portion are pressed against each other, thereby braking the retainer.

13. The four-wheel-drive all terrain vehicle according to claim 12, wherein the cam protrusion is provided in the cam plate, and the pressure-retaining portion is provided in the braking plate.

14. The four-wheel-drive all terrain vehicle according to claim 12, wherein the pressure-receiving portion is of a leaf-spring shape.

* * * * *